April 28, 1925.
L. W. THOMPSON
1,535,877
REGULATING SYSTEM
Filed April 23, 1924
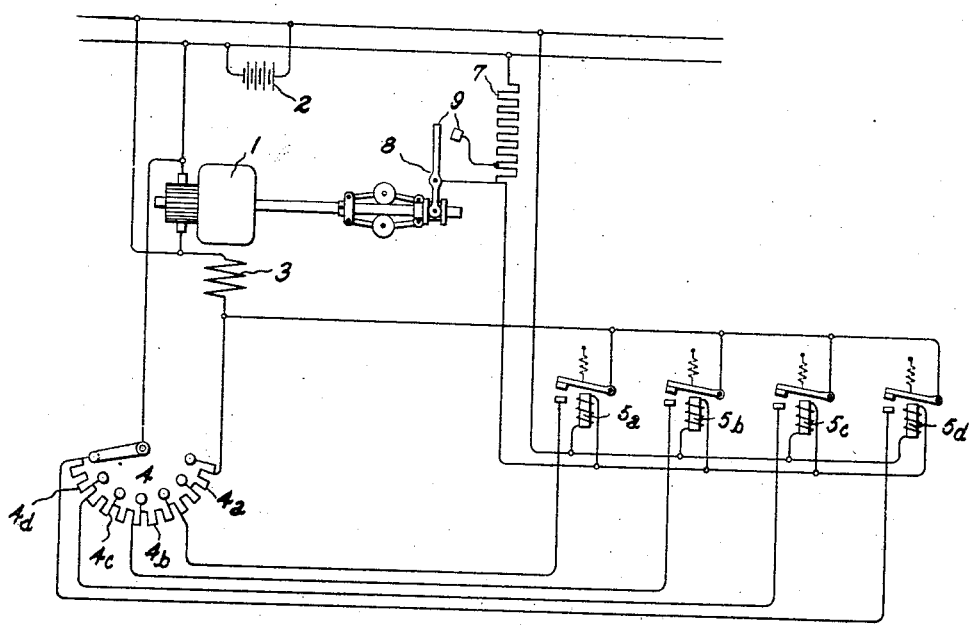
Inventor:
Louis W. Thompson,
by Alexander S. ...
His Attorney.

Patented Apr. 28, 1925.

1,535,877

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM.

Application filed April 23, 1924. Serial No. 708,560.

*To all whom it may concern:*

Be it known that I, LOUIS W. THOMPSON, a citizen of the United States, residing at Schenectady, in the county of Schenectady, State of New York, have invented certain new and useful Improvements in Regulating Systems, of which the following is a specification.

My invention relates to regulating systems and particularly to a regulating system for maintaining constant the speed of a motor which is supplied from a variable voltage source.

My invention is of particular utility in systems where the source is a storage battery. As is well known in the art the voltage of a storage battery varies with the charge therefor and the load connected thereto. Also it is well known that a higher voltage than the discharge voltage of the battery is required to charge the battery. Therefore in a system in which a motor is supplied from a storage battery, and particularly one in which the battery is arranged to be charged while in service, it is necessary to provide a regulating system which will take care of a wide range in supply voltage in order to maintain the speed of the motor constant.

One object of my invention is to provide an improved regulating system for controlling the speed of a motor which is supplied from a variable voltage source.

My invention will be better understood from the following description when taken in connection with the accompanying drawing, and its scope will be pointed out in the appended claims.

Referring to the accompanying drawing, which shows diagrammatically a speed regulating system for a direct current motor, 1 represents the direct current motor, the speed of which it is desired to maintain constant. The motor is connected to a source of current 2, shown as a battery, the voltage of which, as is well known in the art, may vary over a considerable range under certain conditions. The motor 1 is provided with a shunt field winding 3, which has connected in series therewith a resistor 4, which is arranged to be short circuited in accordance with the speed of the motor and the voltage of the source 2 by means of my improved regulating system.

As is well known to those skilled in the art, the speed of a shunt or compound direct current motor may be regulated by varying the amount of resistance in the shunt field circuit thereof. For accomplishing this result it has been the practice to provide a resistor in series with the shunt field winding of the motor and a pair of centrifugally operated contacts controlled by the speed of the motor armature for effecting the closing and opening of a short circuit around the resistor in the field circuit to maintain constant the speed of the motor. In some cases the centrifugally operated contacts directly close and open the short circuit, and in other cases the contacts control the circuit of a control relay which opens and closes the short circuit. The above described arrangement, however, is not satisfactory when the excitation of the motor has to be varied over a very wide range in order to maintain constant speed because of the burning and sticking of the short circuiting contacts. This burning and sticking is due to the fact that the resistor which is short circuited has to have a high value of resistance in order to obtain the desired range of regulation. Furthermore, with such an arrangement, hunting of the motor is excessive because of the large change in the excitation produced by opening and closing the short circuit around the high resistor in the motor field circuit.

In order to overcome these difficulties, I provide a plurality of vibratory relays which are energized by the variable voltage source, and arrange the relays so that they operate successively in response to different values of voltages to short circuit different portions of the field resistor to maintain the motor speed constant. With such an arrangement, each relay controls a short circuit around only a small portion of the total resistor so that sparking and burning of the contacts and hunting of the motor are prevented.

As shown in the drawing, the resistor 4 is divided into four equal sections $4^a$, $4^b$, $4^c$ and $4^d$, and four relays $5^a$, $5^b$, $5^c$ and $5^d$ are provided for short circuiting the respective resistor sections. The windings of these four relays, which are connected in parallel with each other, are connected across the supply circuit 2 with a suitable current limiting means such as a resistor 7 in series therewith, a portion of which is arranged to be short circuited by a suitable speed responsive device 8 when the speed of the motor is above a predetermined value. As shown, the speed responsive device 8 is of the well known centrifugally operated type and is arranged to close the contacts 9 when the speed of the motor is above a predetermined value. The relays $5^a$, $5^b$, $5^c$ and $5^d$ are arranged to operate in response to successively higher voltages, the relay $5^a$ being arranged, when sufficiently energized, to short circuit the portion $4^a$ of the resistor 4, the relay $5^b$ being arranged to short circuit the portion $4^a$ and $4^b$, the relay $5^c$ being arranged to short circuit the portion $4^a$, $4^b$ and $4^c$, and the relay $4^d$ being arranged to short circuit all of the resistor 4. The relays $5^a$, $5^b$, $5^c$ and $5^d$ and the resistor 7 are arranged, however, so that whenever the voltage of the source 2 is high enough to cause either the relay $5^b$ or $5^c$ or $5^d$ to be operated by the operation of the centrifugally operated speed device 8, the contacts of all of the relays which are set for lower voltages than the one that is being operated, are closed permanently. Therefore, for example, when the relay $5^d$ is being operated, the contacts of all of the other relays remain closed so that when the relay $5^d$ opens its contacts, only the portion $4^d$ of the resistor is inserted in series with the field winding 3.

While the resistor 4 is shown as being divided into four equal sections, it is evident that my invention is not limited to having the resistor divided into any particular number of sections nor to having the sections equal.

Let it be assumed for example that the voltage of the battery is very low so that when the speed of the motor tends to exceed a predetermined value and the device 8 closes its contacts 9, the increase in voltage produced across the relays by the closing of the contacts 9 is only high enough to operate the relay $5^a$. The relay $5^a$ closes its contacts and short circuits the section $4^a$ of the resistor 4. This increases the excitation of the motor so that the motor slows down and the contacts 9 open. The opening of the contacts 9 deenergize the relay $5^a$, which in turn opens the short circuit around the section $4^a$ of the resistor 4. This decreases the excitation of the motor so that the motor speed increases and the contacts 9 are again closed. The above described cycle of operation is then repeated. During this operation the contacts of the relay $5^b$, $5^c$ and $5^d$ remain open so that sections $4^b$, $4^c$ and $4^d$ remain permanently connected in the field circuit of the motor.

As the voltage of the source 2 is increased, the relay $5^a$ has to maintain its contacts closed more and more of the time in order to maintain the speed of the motor constant. When the voltage of the battery is above a predetermined value, the operation of speed device 8 does not decrease the voltage sufficiently to cause the relay $5^a$ to open its contacts. Therefore so long as the voltage remains above this value the relay $5^a$ maintains the section $4^a$ permanently short circuited. Relay $5^b$ is arranged so that it begins to vibrate at substantially the same voltage at which relay $5^a$ stops vibrating so that when the voltage increases above this value the relay $5^b$ is vibrated by the operation of the speed responsive device 8 to control the short circuit around the section $4^b$ to maintain the speed of the motor constant. When the voltage of the source exceeds a predetermined higher voltage the relay $5^b$ stops vibrating and the relay $5^c$ begins to vibrate to open and close a short circuit around the section $4^c$. Similarly, when the voltage of the source exceeds a still higher voltage the relay $5^c$ stops vibrating and the relay $5^d$ begins to vibrate to open and close a short circuit around the section $4^d$. In this manner it will be observed only a small portion of the total resistor 4 is short circuited in order to maintain the motor speed constant at any supply voltage within the range of the regulator.

While I have shown and described one embodiment of my invention, it is obvious that various modifications may be made by one skilled in the art without departing from the spirit and scope of my invention. Therefore I desire it to be understood that I seek to cover in the appended claims all those modifications that fall within the true spirit and scope of my invention.

What I claim as new and desire to secure by Letters Patent of the United States, is:

1. A regulating system for maintaining constant the speed of a motor which is supplied from a variable voltage source comprising a resistor arranged so that short-circuiting said resistor varies the excitation of said motor, a plurality of relays arranged to short circuit different portions of said resistor, each relay being connected across said source and being responsive to a different voltage, and means responsive to the speed of said motor for varying the voltage impressed on said relays.

2. In a regulating system, a source of variable potential, a motor connected to said source, a resistor arranged so that short circuiting said resistor varies the excitation of said motor, a plurality of relays connected in parallel across said source, each relay being arranged to short circuit a different portion of said resistor and being responsive to a different voltage, current limiting means in series with said relays, and means responsive to the speed of said motor for varying said current limiting means to vary the voltage impressed on said relays.

3. In a regulating system, a source of direct current having a variable potential, a direct current motor connected to said source, a resistor arranged so that short-circuiting said resistor varies the excitation of said motor, and means for maintaining the speed of said motor constant comprising a plurality of relays connected across said source, each relay being arranged to short circuit a different portion of said resistor and being responsive to a different voltage of said source, a resistor in the circuit of each relay, and means responsive to the speed of said motor for short circuiting said last mentioned resistor.

4. In a speed regulating system, a source of variable potential, a motor connected to said source, a field winding for said motor, a resistor in series with said field winding, a plurality of relays connected to said source, said relays being arranged to operate in response to different voltages to short circuit different portions of said resistor, and speed responsive means for varying the voltage impressed on each relay.

5. In a regulating system, a source of variable potential, a motor connected to said source, a field winding for said motor, a resistor connected in series with said field winding, a plurality of relays connected in parallel across said source and arranged to operate in response to predetermined successive voltages to short circuit different portions of said resistor, a resistor connected in series with said relays, and means responsive to the speed of said motor for short-circuiting said last mentioned resistor to vary the voltages impressed on said relays.

In witness whereof, I have hereunto set my hand this 22nd day of April, 1924.

LOUIS W. THOMPSON.